United States Patent [19]

Willis et al.

[11] Patent Number: 5,145,814
[45] Date of Patent: Sep. 8, 1992

[54] IN SITU METHOD FOR PRODUCING HYDROSULFITE BEACH AND USE THEREOF

[75] Inventors: Mitchell J. Willis; Raymond H. Young, both of Macon; Ellen S. Forbus, Jones; Larry W. Donaldson, Macon, all of Ga.

[73] Assignee: Engelhard Corporation, Iselin, N.J.

[21] Appl. No.: 776,507

[22] Filed: Oct. 11, 1991

[51] Int. Cl.$^5$ .............................................. C04B 33/02
[52] U.S. Cl. .................................. 501/146; 106/488; 162/181.8
[58] Field of Search ............... 501/145, 146, 147, 148; 106/486, 488, 416; 162/181.8

[56] References Cited

U.S. PATENT DOCUMENTS 4,157,980  6/1979  Tiethof ................................ 423/515

Primary Examiner—Mark L. Bell
Assistant Examiner—Paul Marcantoni
Attorney, Agent, or Firm—Inez L. Moselle

[57] ABSTRACT

A process for reacting metallic iron with sulfur dioxide ($SO_2$) gas in the presence of water and bleachable matter, especially iron-contaminated kaolin clay, whereby the kaolin or the like is bleached in situ.

7 Claims, 4 Drawing Sheets

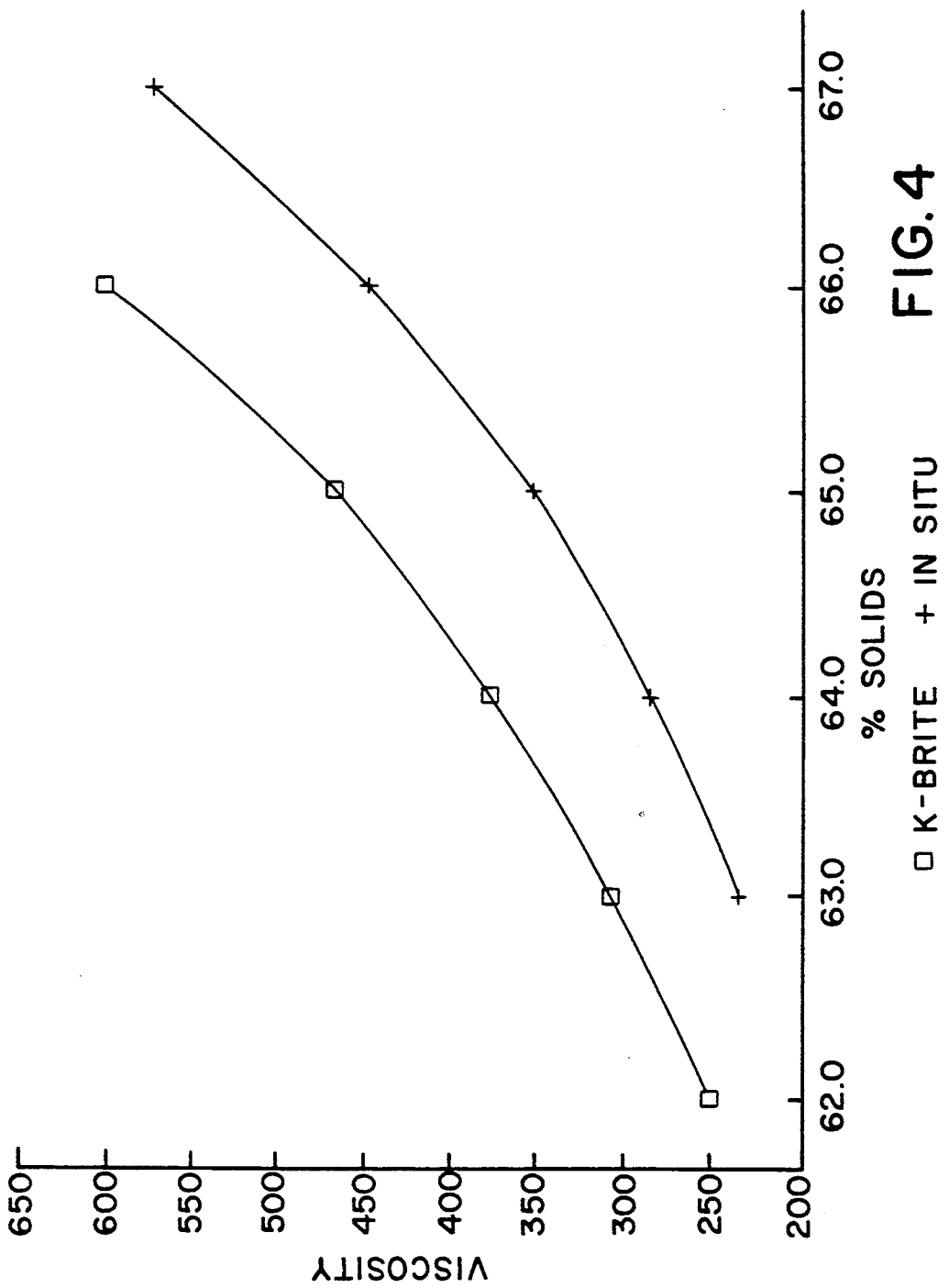

IN SITU METHOD FOR PRODUCING HYDROSULFITE BEACH AND USE THEREOF

FIELD OF INVENTION

This invention relates to an in situ method for producing a hydrosulfite (dithionite) bleach reagent wherein the bleach reagent is generated in situ in the presence of bleachable particulate material. More specifically, the invention relates to an improved process for reacting metallic iron with sulfur dioxide ($SO_2$) gas in the presence of water and bleachable matter, especially iron-contaminated kaolin clay, whereby the kaolin or the like is bleached in situ.

BACKGROUND OF THE INVENTION

Vast quantities of purchased sodium hydrosulfite solution are consumed by the kaolin industry as a reducing bleach reagent. Reductive bleaching improves the brightness and color of the clay by action on iron contaminants. Conventional reduction bleach of a kaolin slip is usually performed in in-line processing equipment including multiple static mixers through which the aqueous slip of kaolin is passed through a piping system. Typically, the slip is at about 30% solids or less to maintain fluidity. Prior to bleaching, the slip is acidified with alum, sulfuric acid or a combination thereof in order to maximize the effectiveness of the hydrosulfite bleach.

The cost of the sodium hydrosulfite bleach reagent represents a significant cost in the wet processing of kaolin ores. Not only is the chemical expensive, but it is supplied as a solution that requires refrigeration and storage under a nitrogen blanket, along with the addition of caustic stabilizers to assure activity. Dry powdered sodium hydrosulfite is stable but has been known to ignite in the presence of moisture. Thus, it is not practical for the industry to employ the powder.

Prior to the use of purchased sodium hydrosulfite solutions, zinc hydrosulfite was produced on site by most kaolin producers. The change to sodium hydrosulfite was caused by the need to remove zinc from waste water as a result of environmental regulations.

Long prior to the commercial use of preformed sodium hydrosulfite or its predecessor zinc hydrosulfite to bleach minerals such as kaolin, it was proposed (UK Patent Specification, 181,132 accepted Jun. 12, 1911) to bleach minerals, such as kaolin, by charging the mineral matter to a vessel, adding water and then introducing particulate metal and saturating the water with $SO_2$ gas. Platinum and iron are disclosed in the UK patent but there is an expressed preference for zinc. Over a half-century ago, a modification of such procedure was proposed in which a clay slip was first treated with sulfur dioxide and then with zinc dust. See U.S. Pat. No. 2,149,506 (1939). As noted above, zinc hydrosulfite, either purchased or generated on site, eventually became an industry standard.

A return to the use of metals as reactants in hydrosulfite bleach manufacture appears in U.S. Pat. Nos. 4,076,795 (1978) and 4,157,980 (1979). These patents relate to the manufacture of reduction bleaches using iron or aluminum powders and sulfur dioxide in attempt to improve bleach systems available at that time. The process using iron (U.S. Pat. No. 4,076,795) was used commercially in a plant of the assignee and generated a sodium hydrosulfite solution as the bleach reagent. In carrying out the process, the reaction product between sulfur dioxide and iron and was converted to the sodium form, generating a hydrated iron-oxide by-product. The major difficulty in the manufacturing process was the removal of the precipitated iron oxide by-product from the bleach.

There are many incentives to use the in situ reaction of iron and sulfur dioxide to bleach clay slips instead of employing purchased sodium hydrosulfite solution. Simple calculations point to a potential to reduce chemical costs significantly, assuming that the material will have the capability of bleaching iron in an iron-stained clay. An in situ bleach also offers the potential to avoid storage problems encountered in storing purchased sodium bleach.

The long span of time subsequent to the above-cited British Specification and the present invention attests to the difficulties in using iron in an in situ bleach. The aforementioned plant scale operation using iron and sulfur dioxide in a non in situ process (which generated sodium hydrosulfite as the actual bleach reagent rather than a iron hydrosulfite) suggests that it was not obvious to use an iron salt to bleach iron-contaminated clay.

Prior to the present invention, it was not known, one way or another, whether the reaction product of metallic iron and sulfur dioxide would result in a reducing bleach capable of removing an iron stain from a kaolin. One possibility would be that the iron in the bleach reagent would actually further stain the kaolin.

Simple batch experimentation using sufficient sulfur dioxide to react with all the iron indicated that the chemistry was indeed favorable. Thus, using laboratory scale glassware, sulfur dioxide was bubbled through a fritted glass tube into a beaker containing a slip of kaolin of the type known to respond to bleaching with sodium hydrosulfite. Iron was added either before or after addition of the sulfur dioxide. The treated clay was flocced by the presence of sulfur dioxide in the slip, thus being in a condition suitable for filtration. After filtration and washing, the results were generally similar to those realized with the sodium hydrosulfite bleach.

However, efforts to translate the laboratory batch-scale in situ iron/sulfur dioxide process to a continuous commercially viable operation were beset with formidable difficulties. Generally, the problems resulted from the need to operate on a continuous basis in which large volumes of clay slips are continuously charged with relatively small amounts of iron and sulfur dioxide.

Feeding sulfur dioxide gas on a continuous basis presented a serious challenge. Equipment of the type used in treating municipal wastes or the like with chlorine gas were trialed, the gas injector being submerged in a tank holding the clay slip with added iron powder. One of the major difficulties in adapting the equipment to this new use was that the specific gravity of the iron powder (8 g/cc) was so much higher than that of the clay slip (1.22 g/cc). Consequently, the iron powder could not be suspended in the slip of clay to be bleached. It was concluded that current technology could not provide a means for controlling the extremely small flow of solid iron powder into a liquid stream of the clay feed.

SUMMARY OF THE INVENTION

The present invention comprises a continuous method of bleaching particulate material, especially iron-stained kaolin, which comprises: (a) providing a flocculated aqueous suspension of particulate iron in which the iron is suspended as a result of being suspended by flocculated kaolin; (b) continuously introducing the suspension of iron into a mixer provided with means therein for internal recirculation along with a suspension of material to be bleached while simultaneously continuously introducing sulfur dioxide gas under vacuum into said mixer, the relative proportion of sulfur dioxide to particulate iron being introduced into the mixer being at least sufficient for all of the iron to react with the sulfur dioxide and the amounts of iron and sulfur dioxide relative to material be bleached being sufficient to bleach the bleachable matter and to flocculate bleachable matter; (c) continuously withdrawing a flocculated aqueous suspension of bleached particulate matter from the mixer; and (d) separating the bleached particulate matter from the aqueous phase of the suspension, the aqueous phase containing soluble ferrous iron and oxides of sulfur.

In preferred embodiment the bleachable matter is an iron stained mineral, especially an iron stained silicate mineral.

In one especially preferred embodiment of the invention, a bleachable iron oxide contaminated kaolin is in situ bleached using a particulate iron introduced while in a suspended state and intimately mixed in the presence of a sulfur dioxide flocculated suspension.

In another preferred embodiment the material to be bleached is iron contaminated kaolin and the particulate iron is introduced into the mixer as a suspension of a flocculated unbleached kaolin slip utilizing alum, e.g., aluminum sulfate, as the flocculating agent.

Another embodiment of the invention is especially directed to the use of the in situ process of the invention in the treatment of high viscosity kaolin clays in which the undesirable high viscosity is attributable to a montmorillonite contaminant which generally remains with kaolin when the kaolin subjected to conventional processing schemes. In practice of this embodiment of the invention, a high intensity magnetic purification step, which conventionally is carried out before bleaching, is carried out after the bleached flocculated slurry is filtered and redispersed (using the iron/$SO_2$ in situ process), thereby unexpectedly achieving a desirable reduction in clay viscosity as a result of in situ bleaching.

In the accompanying figures:

FIG. 1 is a diagrammatic sketch of a reactor apparatus useful in practice of the invention.

FIG. 2 is a flow diagram illustrating an especially preferred embodiment of the invention in which iron powder is fed to the apparatus such as illustrated in FIG. 1 in the form of a fluid suspension in which the iron is suspended in a previously bleached clay slurry thickened as a result of acidification occurring as a result of addition of sulfur dioxide during bleaching in an amount that is in excess of that required for stoichiometric reaction with sulfur dioxide.

FIG. 3 also shows conventional kaolin processing.

FIG. 4 is a graph comparing viscosity (Brookfied method) of products bleached by the in situ iron/$SO^2$ method and conventional sodium hydrosulfite technique.

DETAILED DESCRIPTION OF THE INVENTION

Figure 1:
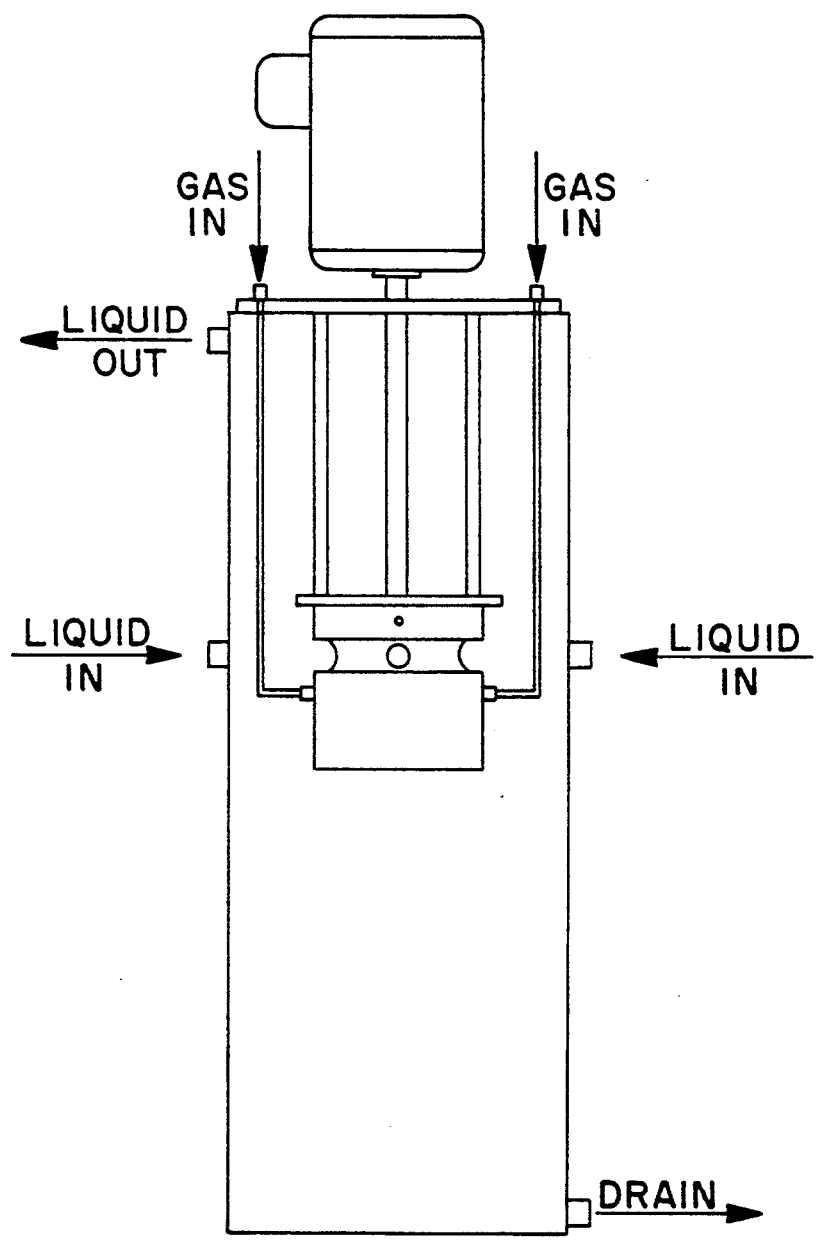

The general chemistry or the in situ reaction is $Fe + 2 SO_2 \rightarrow FeS_2O_4$. The ionic species, as the result of such reaction, include the dithionite ion ($S_2O_4-2$) and $Fe+2$. In typical practice of the invention, exemplified by tests described in the accompanying examples, iron is added at a rate approaching 1 to 1½ dry pounds/ton and $SO_2$ at 10–15 pounds/ton. (See Table 1). This addition level compares to a conventional reduction bleach addition rate of approximately 2 to approximately 4 pounds/ton of dithionite.

Evaluating the raw material costs of generating a dithionite bleach utilizing elemental iron and $SO_2$ indicates the raw material costs should be substantially less than that of the conventionally used sodium salt. Economics are enhanced as the result of not having to form the sodium salt which is commercially required for stability. In addition, a processing advantage results as a result of the fact that there is a smaller content of soluble species in the pulp. Also, higher bleach activity is realized because dithionite ion is generated and consumed essentially in an instantaneous manner.

Aqueous suspensions of bleachable clay used in practice of the present invention may be produced using conventional technology. As in conventional bleaching, these suspensions should be sufficiently fluid to be pumpable and are usually referred to as "slips". Generally, a dispersant is present to permit the preparation of slips having reasonably high solids but satisfying the fluidity requirement. Conventional clay dispersant or dispersant mixtures may be used. By way of nonlimiting examples, these dispersants include alkaline alkali metal silicates such as sodium silicate, alkali metal condensed phosphates such as tetrasodium pyrophosphate, polyacrylate salts, soda ash and mixtures thereof. Typically, the pH value of the kaolin slip is mildly alkaline to neutral or mildly acidic, e.g., pH in the range of 5 to 9, most usually 6 to 8.

In order to bleach kaolins to optimum values and also place the kaolin in a flocculated condition amenable to filtration, the pH of the clay slip is reduced to a value below 4.5, most usually below 4.0, prior to bleaching. In conventional bleaching operations, the slip of bleachable kaolin is flocculated by addition of sulfuric acid, alum or both prior to adding dithionite bleach. Since the dispensed slip contains alkali metal and polyanionic species introduced as dispersant, reaction between dispersant and sulfuric acid and/or alum in conventional practice results in the formation of soluble salts which must be removed from the clay by washing the filtered bleached clay in order to provide coating grades clays having desirable viscosity. Formation of by-product salts is minimized or avoided in practice of this invention. The quantity of by-product salts is especially low when sulfur dioxide gas is used in amount in excess of that required to flocculate the kaolin, and to react with essentially all of the particulate iron while the feed slip is in the reactor.

The amount of particulate iron charged to the reactor is typically in the range of 1 to 1½ dry pounds per ton of clay although amounts can be higher or lower, e.g., from ½ to 4 pounds per ton of clay. Obviously, the weight of iron is minor compared to the weight of clay feed.

To control the flow of the extremely small amount of iron relative to feed clay, the iron is formed into a pumpable suspension in which the iron particles are held in suspension by flocculated kaolin. One suitable method for flocculating kaolin to function as a suspending agent for particulate iron is to add alum, which can be a pure aluminum sulfate or even an iron/aluminum sulfate mixture. The amount of alum required to flocculate and thicken the kaolin in the suspending system can be determined by simple experimentation and will vary with the solids of the system, the particle size of the kaolin and the pH of the kaolin system prior to addition of alum. Using a typical dispersed kaolin slip at 30% solids, from 2 to 8# alum per ton of kaolin, usually about 4# alum per ton of kaolin will suffice. Without addition of alum (or other acidic flocculant described below), the iron will sediment from the suspension, presenting feeding problems and impairing the efficiency of the bleach reaction.

Useful grades of iron are those having an average particle size in the range of 4-1500 microns. High purity iron is suitable although impure grades can be used provided the amount of potentially colored species, such as chromium ions, is limited.

Figure 2:
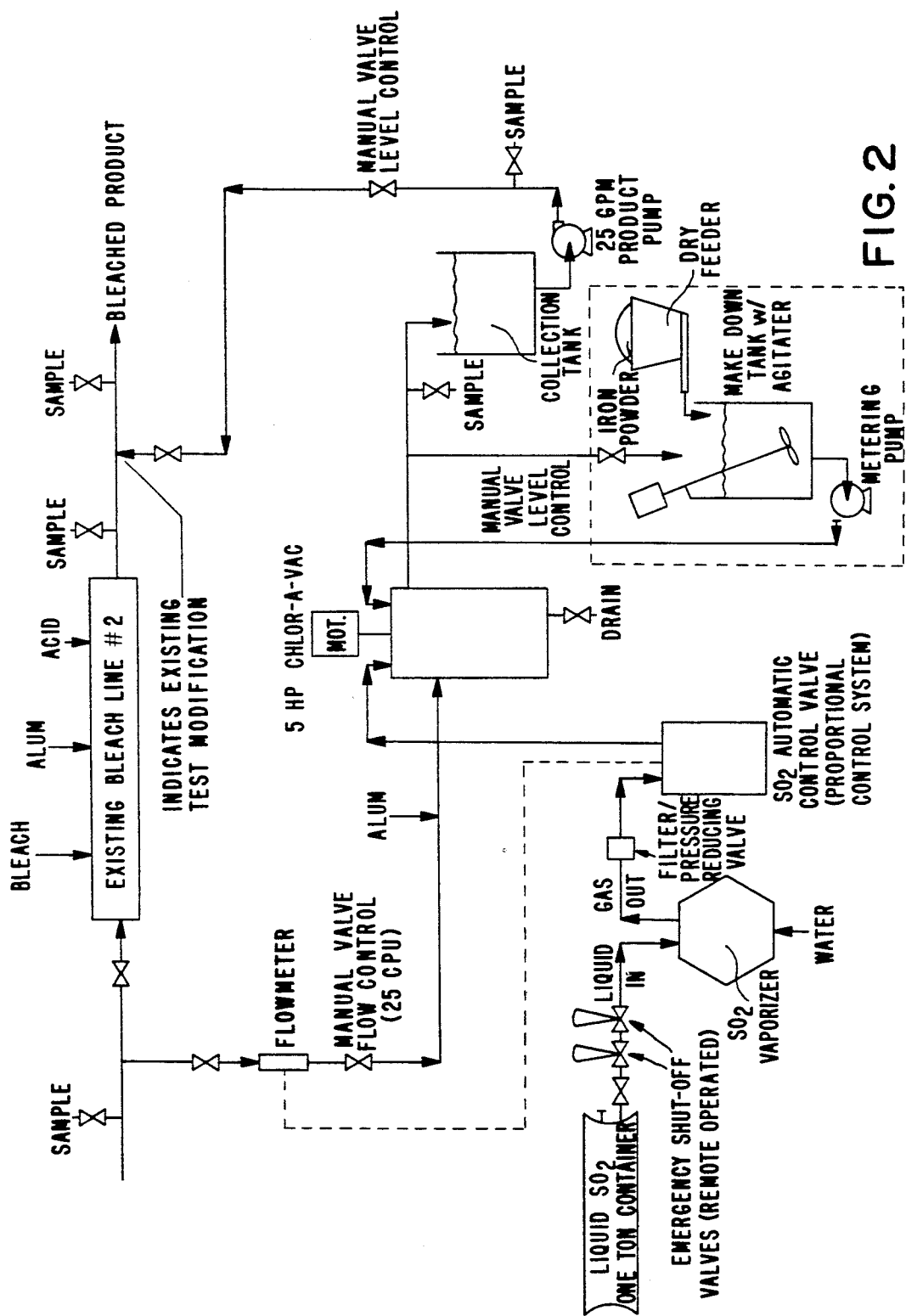
Figure 3:
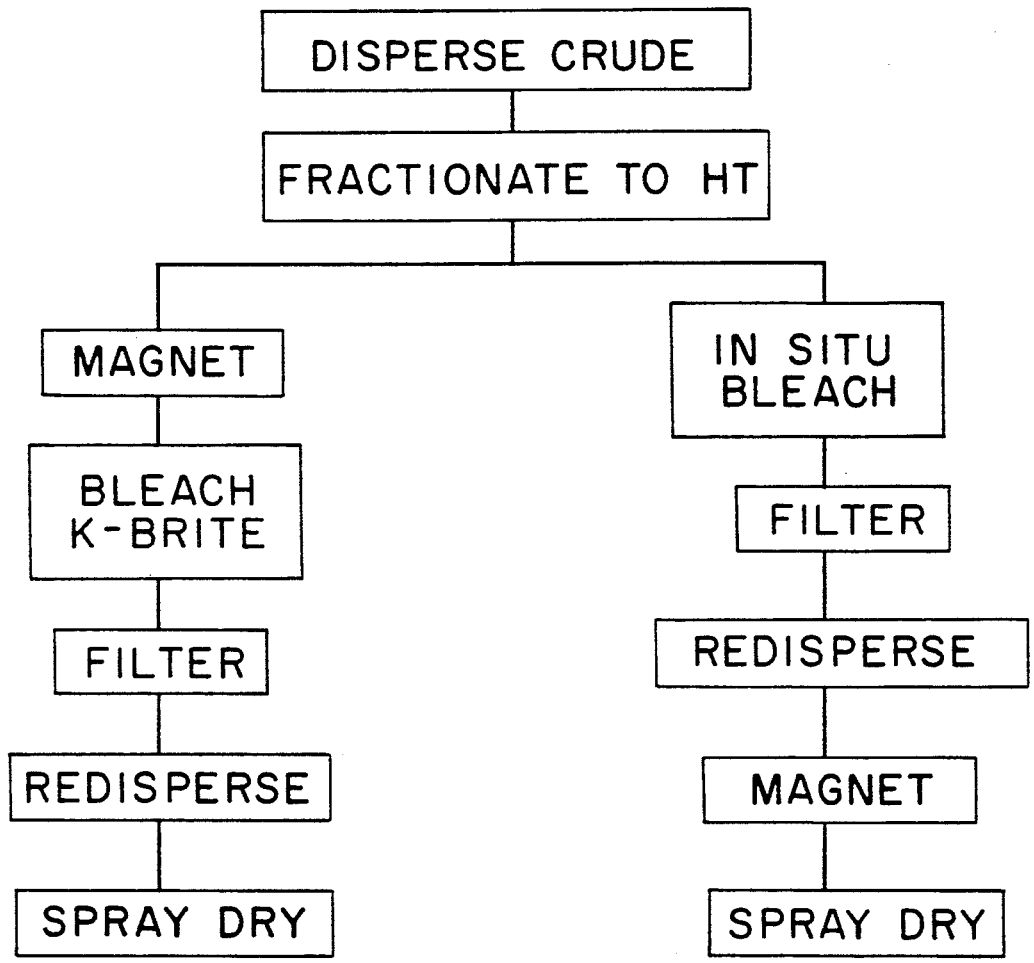
FIG. 3 is a flow scheme for carrying out the process of the invention in conjunction with other kaolin benefication steps with a high viscosity kaolin in a manner such as to improve the viscosity of the kaolin as well as to bleach the kaolin.

One especially preferred means for flocculating and thickening the iron suspension prior to feeding to the reactor is to incorporate sulfur dioxide into an aqueous clay/iron system at a sufficiently high concentration to flocculate the kaolin, thus, thickening the system. In preferred commercial practice, a slip stream of previously bleached kaolin (which is flocculated by sulfur dioxide as a result of the use of an excess of sulfur dioxide) will be charged to the reactor. See FIG. 2. This stream has about the same clay solids content as the feed clay, e.g., about 30% solids.

Sulfur dioxide is charged to the reactor as a gas. The amount of sulfur dioxide is at least sufficient to react with all of the iron by the reaction $Fe + 2SO_2 \rightarrow FeS_2O_4$. When sulfur dioxide is employed in the in-situ reaction, the resulting flocculated product can be used as a suspending agent for the particulate iron. When iron is suspended in an in situ flocculated bleached slurry, the pH and the redox potential is dependent on the concentration of the iron powder in the suspension. Above 25 pounds of iron powder per ton of kaolin, the pH approaches near neutral (6-7) and the redox potential approaches a very low range $-500$ mv to $-700$ mv. The highly reducing condition of the iron containing suspension helps prevent the oxidation of the iron powder to an unusable form during storage.

The residence time in the reactor ranges from 10-90 sec. The residence time is controlled by the feed rate to the vacuum induction system.

As soon as the bleached clay is discharged from the vacuum induction system, the bleached slurry should be filtered and washed to avoid oxidation of ferrous ions to colored species.

The Chlor-A-Vac unit, employed in illustrative examples consists of a motor, titanium casing, titanium shaft, Hastalloy impeller, and a heavy-duty specially machined PVC injector housing. The motor spins the impeller inside the housing, resulting in an internal recycle rate in a 15 gallon reactor of 37-82 GPM (gallons per minute). The slurry water enters the unit through six (6) inlet ports, and is forced downward through a venturi where a strong vacuum is created. At this point, a gas is induced. The impeller then mixes the gas and slurry and discharges the slurry into the reactor housing.

EXAMPLE 1

This example illustrates that, using laboratory scale glassware equipment, iron powder can be reacted with $SO_2$ in situ in the presence of discolored kaolin, to bleach the kaolin. In carrying out the tests, $SO_2$ was bubbled through a fritted glass tube into a 1000 ml tall beaker which contained 100 grams of kaolin as a 30% solids slurry. Iron powder was added either before or after the addition of $SO_2$. Samples were filtered after one hour. The brightness and color of products were found to be similar to that of conventionally bleached product. Filtration rates were also similar for the in situ process as determined by the conventional process utilizing a leaf filter test.

Typically 90-100% of the added iron was recovered as a soluble ferrous or ferric ion in the filtrate. Iron powders with an average particle size of 4-1500 microns were effective. Agitation and protection with a nitrogen atmosphere were found to improve the response with the slower reacting coarse powders.

Utilizing this laboratory scale equipment, a flotation beneficiated No. 1 coating clay grade of kaolin (90% finer than 2 microns) was bleached using the in situ process. The feed clay was a dispersed slip at 30% solids (pH 8.3). An 87.5 unbleached product was bleached to 90.9 brightness with 1#/T of Fe powder and 10#/T of $SO_2$. The same product bleached to an 89.9 brightness with 14#/T of sodium dithionite.

A mechanically delaminated kaolin (about 80% finer than 2 microns) was bleached in the laboratory using the laboratory in situ process. The delaminated kaolin was employed as a dispersed slip at about 30% solids. pH was 7.8. The following results were obtained. An 85.4 unbleached product was bleached to an 88.0 brightness with 1#/T of Fe powder and 16#/T $SO_2$. The same product bleached to an 88.0 brightness with 12#/T of sodium dithionite.

EXAMPLE 2

Using discolored kaolin clays fractions similar to those used in the previous example, tests were carried out to determine whether steel wool, rather than particulate iron, could be used in an in situ process. In these tests cylindrical vessels having various L/D ratios (height of vessel divided by diameters) were evaluated to determine the effect of variation of space velocity on the bleaching reaction.

Low brightness following a short peak of maximum brightness after starting up the reactor were observed. This occurred even after the addition of distributor plates to keep steel wool pads separated. The undesirable bleaching pattern was later found to be caused by excessive consumption of the steel wool in the initial period of operation. A period of low brightness would then follow because insufficient iron was present in the reactor zone.

EXAMPLE 3

Bleaching of kaolin slurries was also successful using in-line static mixing equipment, but questions on how to add $SO_2$ and iron powder to the slurry in a full scale system were raised. Significant back pressure and concerns about being able to obtain effective mixing were observed and resulted from surging in the in-line mixing system and inability to control in a steady state manner. Thus, a search for alternate technologies led to evaluation of gas-liquid mixing systems normally used for water applications.

EXAMPLE 4

This example illustrates the embodiment of the invention in which sulfur dioxide gas was metered into a closed vessel (Chlor-A-Vac Model P-234) provided with internal means to circulate reactor unit liquids along with a fluid slip composed of iron powder suspended in a flocculated and thickened slurry of bleachable kaolin clay and a dispersed 30% solids slip of bleachable kaolin (same bleachable kaolin used to suspend the iron).

The iron suspension was formed in a mixer by adding 4#/ton alum/ton clay kaolin to flocculate a 30% solids slurry of a No. 2 fraction (80% minus 2 microns) of kaolin, and then adding minus 325 mesh iron sponge powder (Hoeganes ATW-230) in amount of 0.18# of iron powder per gallon of suspension.)

The iron suspension was fed to the system at a rate of 0.15 gallons per minute. The sulfur dioxide gas addition rate was 15 pounds per ton of dry kaolin. This corresponds to an equivalent of about 5#/ton of sodium dithonite bleach. The 81.1 brightness feed kaolin was bleached to an 86.1 brightness product.

When the same material was flocculated in the laboratory with sulfuric acid to a pH of 2 followed by the addition of 7#/T of K-Brite TM (sodium hydrosulfite bleach supplied by Virginia Chemical) an 86.0 brightness was obtained.

When the process was repeated under the same conditions but without thickening the slurry of kaolin used as a vehicle for adding the iron powder, the brightness of the treated clay product was only 82.9, indicating that the necessary reaction conditions could not be achieved.

In order to determine the optimum levels for both the Fe and $SO_2$, the following results were determined by varying the quantities of each component.

| #/T Fe | #T $SO_2$ | Brightness |
| --- | --- | --- |
| 1.5 | 10 | 85.7 |
| 1.5 | 12 | 85.9 |
| 1.5 | 15 | 86.1 |
| 1.0 | 10 | 84.9 |

Maximum brightness could be obtained by the in situ process in as little as 15 minutes as shown by the results in the following table. The unbleached slurry in this case had an 81.0 brightness and a brightness potential of 85.9 with 7#/T of K-Brite bleach.

| Time (min) | Brightness |
| --- | --- |
| 15 | 85.7 |
| 30 | 85.7 |
| 60 | 85.7 |
| 120 | 85.7 |

EXAMPLE 5

In order to simplify the operation of a continuous bleach system, the iron powder was suspended in a side stream of product. This avoided the need to add alum to the iron suspension on a continuous basis. The suspension was formed by placing 40 gallons of $SO_2$ flocculated slurry in a 70 gallon, stainless steel tank with an agitator and adding 7.2# of iron powder. An $SO_2$ flocculated slurry was obtained by running the bleaching apparatus described in Example 4 without the iron suspension addition. When run on a continuous basis the suspension was replaced with a side stream of in situ bleached product, and iron powder was fed into the suspension using an auger type dry feeder (Acrison 105B), running at a rate of 12.3 g/min. As seen in the table below, the suspension was found to be usable for at least a 24 hour period.

| Time (Hr) | Brightness[b] |
| --- | --- |
| 0 | 86.0 ± 0.06[a] |
| 2.5 | 85.8 ± 0.21[a] |
| 5 | 85.9 ± 0.21[a] |
| 24 | 85.9 |

[a]Three samples were collected at 5 minute intervals.
[b]Unbleached brightness 81.1, a control sample bleached with 7#/T K-Brite TM was 86.0.

EXAMPLE 6

A poor fluidity coarse white Georgia clay was bleached in the laboratory system described above and the fluidity of the product was evaluated and compared a to conventionally processed feed. Conventional processing was followed except that magnet separation was performed after redispersion of the filtered material (see process flow sheet).

As can be seen in FIG. 4, the Brookfield viscosity of the in situ processed product was much lower than a control at the same solids. The solids at which the in situ processed product had a Brookfield viscosity of 300 cps was 64% while the conventionally processed product had the same viscosity at a solids level of 62.9%. The difference of 1.3% solids represents a measurable increase in the fluidity for the in situ processed product. Hercules viscosity was essentially unaffected (11.5 and 10.2 dynes at 1100 RPM at 66% solids for the in situ and conventionally processed products, respectively).

Another sample of the slurry described in Example 3 was treated by both the conventional bleaching method and the in situ bleaching method in order to compare other physical properties between products made by the two processes. The low and high stream viscosities, filtration rates, and color analyses are compared in the following table. No major differences can be seen between the two processes.

| | Conventional | In Situ |
| --- | --- | --- |
| Brookfield Viscosity (@ 70% solids) | 180 | 158 |
| Hercules Viscosity (dynes/1,100 rpm) | 5.1 | 5.3 |
| Filtration Rate (#/hr/ft2) | 13.62 | 12.30 |
| Color Analysis | | |
| Elrepho | 83.47 | 84.71 |
| L | 94.45 | 94.72 |
| a | −0.25 | −0.28 |
| b | 4.49 | 3.91 |
| Yellowness Index | 6.83 | 5.93 |

We claim:
1. A continuous method for bleaching particulate material which comprises:
  (a) providing a flocculated aqueous suspension of particulate iron;
  (b) continuously introducing said suspension into a mixer provided with means therein for internal recirculation while simultaneously continuously introducing into said mixer both an aqueous sus- pension of particulate matter to be bleached and sulfur dioxide gas under vacuum, the relative proportion of sulfur dioxide to particulate iron being introduced into the mixer being at least sufficient for all of the iron to react with the sulfur dioxide and the amounts of iron and sulfur dioxide being sufficient to bleach bleachable matter in said aqueous suspension of particulate matter to be bleached;

(c) continuously withdrawing an aqueous suspension of bleached particulate matter from said mixer; and (d) separating said bleached particulate matter from the aqueous phase of said suspension.

2. The method of claim 1 wherein the bleachable matter is an iron stained mineral.

3. The method of claim 1 wherein the bleachable matter is an iron stained silicate mineral.

4. The method of claim 1 wherein the bleachable matter is kaolin.

5. The method of claim 1 wherein the bleachable matter is iron contaminated kaolin and said particulate iron is introduced into the mixer while suspended in a flocculated suspension of kaolin to be bleached.

6. The method of claim 1 wherein the material to be bleached is iron contaminated kaolin and said particulate iron is introduced into the mixer as a suspension of unbleached kaolin to be bleached containing with an alum in amount to flocculate the suspension containing said iron.

7. The method of claim 6 wherein said alum is aluminum sulfate.

* * * * *